United States Patent [19]

Kanehira

[11] Patent Number: 5,530,641
[45] Date of Patent: Jun. 25, 1996

[54] OPTICAL RECORDING MEDIUM HAVING GROOVES AND LANDS AND/OR PLURAL PIT LINES, AND REPRODUCING APPARATUS THEREFOR

[75] Inventor: Jun Kanehira, Tokyo, Japan

[73] Assignee: Olympus Optical Co., Ltd., Tokyo, Japan

[21] Appl. No.: 232,319

[22] Filed: Apr. 25, 1994

Related U.S. Application Data

[63] Continuation of Ser. No. 877,311, May 1, 1992, abandoned.

[30] Foreign Application Priority Data

May 17, 1991 [JP] Japan ................................. 3-113174
Sep. 6, 1991 [JP] Japan ................................. 3-227439

[51] Int. Cl.⁶ .................................................. G11B 7/007
[52] U.S. Cl. ............................ 369/44.26; 369/275.4; 369/109; 369/93
[58] Field of Search ........................ 369/275.3, 275.4, 369/111, 109, 54, 58, 44.26, 108, 110, 112, 44.37

[56] References Cited

U.S. PATENT DOCUMENTS

| | | | |
|---|---|---|---|
| 4,160,269 | 7/1979 | Kramer et al. | 369/109 |
| 4,359,750 | 11/1982 | Howe | 369/275.4 |
| 4,423,502 | 12/1983 | Dil | 369/109 X |
| 4,822,151 | 4/1989 | Tatsuno et al. | 369/121 X |
| 4,932,015 | 6/1990 | Nagashima et al. | 369/44.26 |
| 5,121,378 | 6/1992 | Hirose et al. | 369/112 |

FOREIGN PATENT DOCUMENTS

| | | |
|---|---|---|
| 57-138065 | 8/1982 | Japan . |
| 58-155528 | 9/1983 | Japan . |
| 59-207433 | 11/1984 | Japan . |

OTHER PUBLICATIONS

Extended Abstracts "The 37th Spring Meeting, 1990"; Japan Society of Applied Physics & Related Societies No. 3; p. 926.

SPIE vol. 1078 Optical Data Storage Topical Meeting (1989), pp. 98–104.

*Primary Examiner*—Aristotelis Psitos
*Assistant Examiner*—Duncan Wilkinson
*Attorney, Agent, or Firm*—Frishauf, Holtz, Goodman, Langer & Chick

[57] ABSTRACT

A recording film of a recording medium has tracks with a track pitch of 1.6 μm. Each track has a land and a groove, and the width of each of the land and groove is about 0.8 μm. The groove and land differ relatively in height by a degree corresponding to $(2n-1)/4$ (n: a natural number) times the wavelength of the irradiated beam. At the time of reproduction, reflected diffraction beam components reflected from the land and groove are provided with a phase difference $\pi$. Thus, a peak of the diffraction beam is concentrated within the range of the NA of an objective lens, with high intensity. As a result, the presence/absence of pits located at a distance less than a diffraction limit, which have not been detected in the prior art, can be detected.

26 Claims, 7 Drawing Sheets

OPTICAL RECORDING MEDIUM HAVING GROOVES AND LANDS AND/OR PLURAL PIT LINES, AND REPRODUCING APPARATUS THEREFOR

This application is a continuation of U.S. patent application Ser. No. 07/877,311, filed May 1, 1992, now abandoned.

BACKGROUND OF THE INVENTION

1. Field of the Invention

The present invention relates to a method of optically recording/reproducing data on/from a recording medium, a reproducing apparatus to which the method is applied, and a recording medium applied to the method and reproducing apparatus.

2. Description of the Related Art

In a conventional recording medium, the pitch of tracks on which data is recorded is determined on the basis of a minimum diameter (W) of a spot of a reproducing laser beam, which spot is formed when the beam is converged on the recording medium. The beam spot diameter (W) is given by $$W = 1.22 \times \lambda / NA$$

where $\lambda$ is the wavelength of a recording/reproducing laser beam, and NA is the numerical aperture of an objective lens for converging the laser beam.

Under general conditions, $\lambda = 0.8$ μm and NA=about 0.5, and accordingly W=2 μm.

The beam spot of such a laser beam has a Gaussian distribution of intensity. If the beam spot, which is directed to a target track, is displaced to an adjacent track, the data recorded on the adjacent track is superimposed on a reproduced output and a reproduction error may occur (cross-talk effect).

Thus, the track pitch is determined so as not to cause the cross-talk effect.

In general, the track pitch (TP) is set to be equal to the diameter of that component of the beam, whose intensity at the center of the intensity distribution is $1/e^2$. When the above numerical values are applied, TP=1.6 μm. The track comprises a land and a beam guide groove for enabling the converged beam to scan along the center line of the track.

It has recently been proposed that the track pitch (TP) be reduced to increase the recording density of the recording medium. When the track pitch is decreased, the cross talk increases. As a result, the beam diameter needs to be reduced. For this purpose, for example, the wavelength ($\lambda$) of the laser beam is reduced, or the NA of the objective lens is increased. However, since the wavelength ($\lambda$) of a beam emitted from a conventional semiconductor laser or laser diode (LD) is limited to a range near the infrared, there is a limit for reduction of the beam diameter. In addition, since focus servo operation becomes difficult because of the influence of aberration due to non-uniformity in the thickness of the recording medium and a decrease of beam waist, there is a limit for an increase in the NA of the objective lens.

In order to solve the above problems and enhance the recording density, the following have been proposed.

As a first example, Published Examined Japanese Patent Application (PUJPA) No. 57-138065 discloses a method wherein the difference in height between adjacent tracks is set to be equal to $\lambda/8$ to $\lambda/4$ of the wavelength of a reproducing beam, whereby a main signal is not influenced by pit data recorded on the adjacent track. A push-pull method is adopted in the tracking servo for this optical system; thus, the crosstalk component is decreased and the influence due to the crosstalk effect reduced.

As a second example, PUJPA No. 58-155528 discloses a method wherein a reproducing beam is irradiated onto a track with a v-cross section, and different pit data are recorded on the two inclined surfaces of the track. Reflected beams from the two inclined surfaces are received by different light-receiving elements, thereby reproducing data. Thus, the crosstalk at the time of reproduction can be reduced.

According to a third example, three beams as reproducing beams are scanned on the groove and land on which data is recorded. Specifically, data on a desired groove (or land) is reproduced by a center beam, and data on the lands (or grooves) on both sides of the desired groove (or land) is reproduced by side beams preceding or following the center beam. According to this method, the output from the side lands (or grooves) is canceled from the output from the center groove (or land) by an electronic circuit, thus eliminating crosstalk components.

PUJPA No. 59-207433 shows a fourth example wherein a reproducing beam is scanned on a groove and a land on which relative height data is recorded in a synchronized state, and data on the groove and land is simultaneously reproduced by a push-pull method.

As a fifth example, there is known a method of increasing a data transfer rate. A typical method is to increase the rotation speed of the recording medium, but this method has a problem in precision of servo. To solve this problem, a method has been proposed wherein signals are reproduced in parallel by using a multi-head or a multi-beam. According to this method with an array of four laser diodes (LD), simultaneous reproduction is effected by four beams.

In the first example, data of only one track is reproduced at a time, and the data transfer rate at the time of reproduction is increased.

In the second example, it is technically difficult to form v-tracks precisely and uniformly. In addition, complex control is required to enable a laser beam to trace the v-track.

In the third example, since side beams for detecting crosstalk components precede or follow the center beam, a time lag occurs in canceling the crosstalk components.

In the fourth example, although a high recording density and a high transfer rate can be attained, the recording method is based on phase pit formation, and therefore this method is applicable only to a read-only memory.

In the fifth example, the mechanism for tracking and focusing is complex, and high precision is required for positioning between the track and laser beam.

SUMMARY OF THE INVENTION

The present invention has been made to solve the above problems, and its object is to enhance the recording density by recording different data on grooves and lands which constitute tracks, and to achieve a high transfer rate by simultaneously and independently reproducing the data recorded on the grooves and lands.

In order to achieve the object of the invention, each track of a recording medium has a groove and a land which differ relatively in height by a degree corresponding to $(2n-1)/4$ (n: a natural number) times the wavelength of the irradiated beam. When data is recorded, a recording laser beam is irradiated along the track, and pits coded in accordance with the data are formed on the groove and land. Thus, different data are recorded on the groove and land. When data is reproduced, a reproducing laser beam is simultaneously scanned on the groove and land. Beam components from the groove and land are guided to corresponding detectors, and a variation in light amount corresponding to the presence/ absence of pits is detected. Thus, the data recorded independently on the groove and land are reproduced simultaneously and independently.

According to the present invention, since data are recorded on the groove and land independently, the recording density of the recording medium can be enhanced. In addition, since a phase difference is given to part of a reflected beam reflected from the pits on the recording medium, the presence/absence of pits located at a distance less than a diffraction limit, which have not been detected in the prior art, can be detected precisely. Furthermore, since different data recorded on the groove and land of the track can be reproduced simultaneously, the data transfer rate at the time of reproduction can be enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The principle of the present invention will now be described, and then embodiments of the invention will be described.

The present invention adopts the principle disclosed in *WAVE OPTICS*" (Hiroshi KUBOTA, IWANAMI SHOTEN), i.e. "the resolution limit between two adjacent points is increased by irradiating two coherent beams of opposite phases (phase difference: $\pi$) on the two adjacent points."

Figure 2:
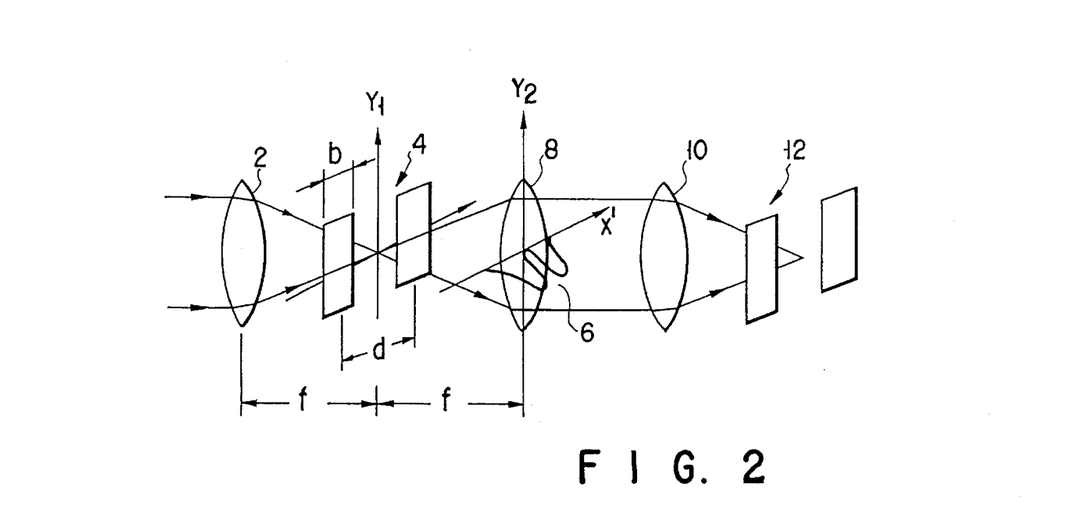
FIG. 2 shows an optical system used for explaining that a resolution limit is increased by irradiating two coherent beams of opposite phases onto a pit pattern.

FIG. 2 shows an optical system, with reference to which the above principle will be explained.

As is shown in FIG. 2, a pit pattern 4 having a pair of pits with a pit width b and a pit distance d is formed at an emission-side focal point $Y_1$ of a first objective lens 2 (the emission-side focal point $Y_1$ is identical to an incidence-side focal point of a second objective lens 8). An image-forming lens 10 is situated on a light path on the emission-side of the second objective lens 8.

Figure 1A:
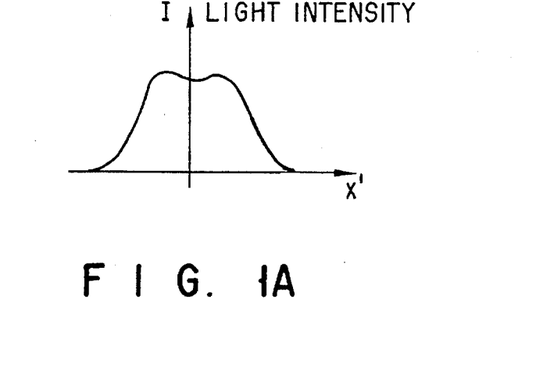
FIG. 1A shows a diffraction image obtained when an incoherent beam is irradiated on a pit pattern shown in FIG. 2.

In this optical system, when an incoherent beam is irradiated on the pit pattern 4 through the first objective lens 2, a diffraction image formed by the pit pattern 4 cannot be resolved when $d=0.61\times\lambda/NA$ or less ($\lambda$=the wavelength of the irradiated beam, NA=the numerical aperture of image-forming lens 10), as shown in FIG. 1A. The resolution in this case is called "Rayleigh resolution."

Figure 1B:
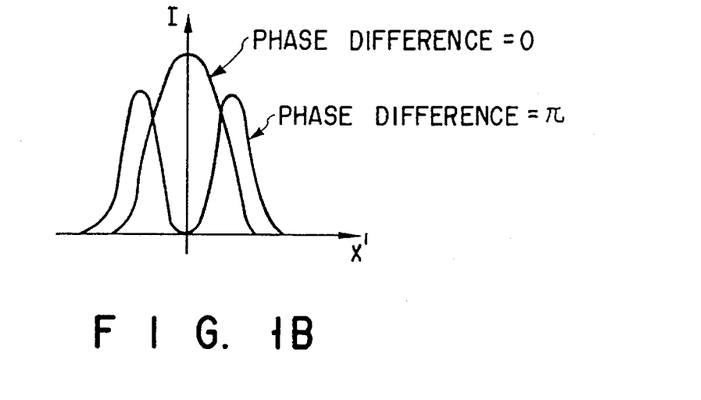
FIG. 1B shows a diffraction image obtained when a incoherent beam is irradiated on a pit pattern shown in FIG. 2.

On the other hand, when a coherent beam is irradiated, the resolution is varied in accordance with the phase of the beam irradiated on the pit pattern 4. Specifically, when there is no phase difference in the beam irradiated on the bit pattern 4, the resolution becomes lower than in the case where the incoherent beam is irradiated. Thus, as shown in FIG. 1B, two points (two pits) at a distance of the Rayleigh resolution are not resolved at all. However, when there is a phase difference $\pi$, the resolution becomes higher than in the case of the incoherent beam. Thus, as shown in FIG. 1B, two points (two pits) at a distance of the Rayleigh resolution can be completely resolved, as shown in FIG. 1B.

A description will now be given to the case where a coherent beam having a phase difference $\pi$ is used as an irradiation beam in the above optical system.

When the coherent beam is converged on the pit pattern via the first objective lens 2, a diffraction pattern 6 corresponding to the pit pattern 4 is produced. The diffraction pattern 6 is expressed by Fourier transform of the pit pattern 4.

When the diffraction pattern 6 is converged through the second objective lens 8 and image-forming lens 10, a real image of the pit pattern 4 is formed as a pattern image 12. This process corresponds to Fourier inverse transform.

When the phase difference of a coherent beam irradiated as the pit pattern 4 is 0 or $\pi$, the light intensity distribution I (x') in the axial direction in each case is given by the following equations. The following equations represent the light intensity distribution at position $Y_2$ of the second objective lens 8.

Phase difference=0

$I_0(x')=4a^2 \cdot sinc^2\xi \cdot cos^2\eta$

Phase difference=$\pi$ $I\pi(x')=4a^2 \cdot sinc^2\xi \cdot sin^2\eta$ $\xi=(\pi/\lambda) \cdot (a/f) \cdot x'$ $\eta=(\pi/\lambda) \cdot (d/f) \cdot x'$ $\lambda$: the wavelength of the coherent beam x': f.sin$\theta$ ($\theta$: diffraction angle)

d: the distance between pits ("pit distance")

Figure 6A:
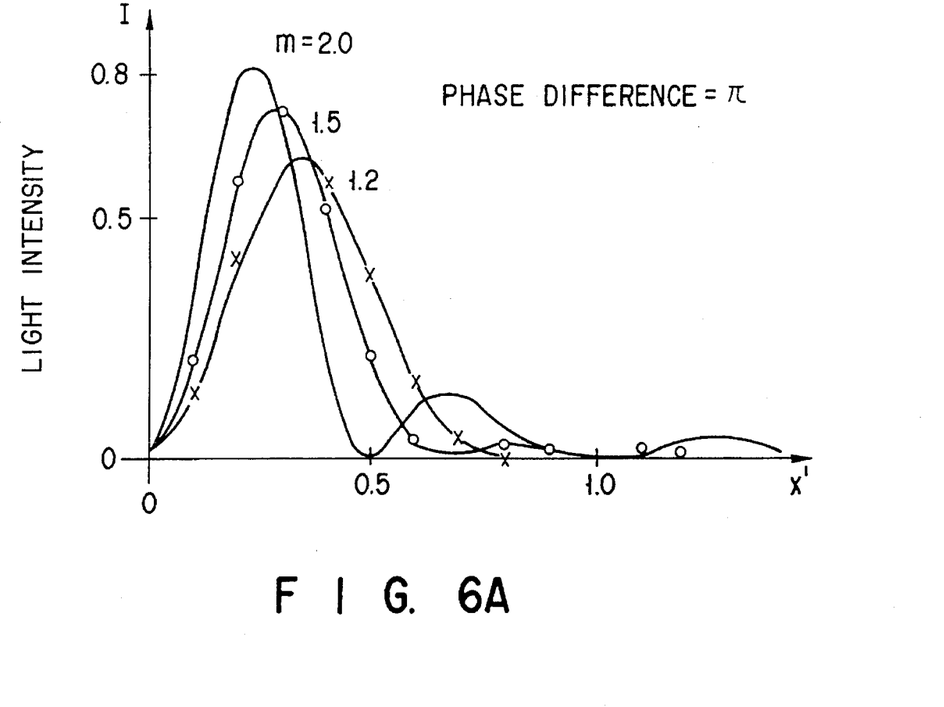
FIG. 6A shows a diffraction light intensity distribution obtained when a coherent beam with a phase difference $\pi$ is irradiated on the pit pattern shown in FIG. 2.
Figure 6B:
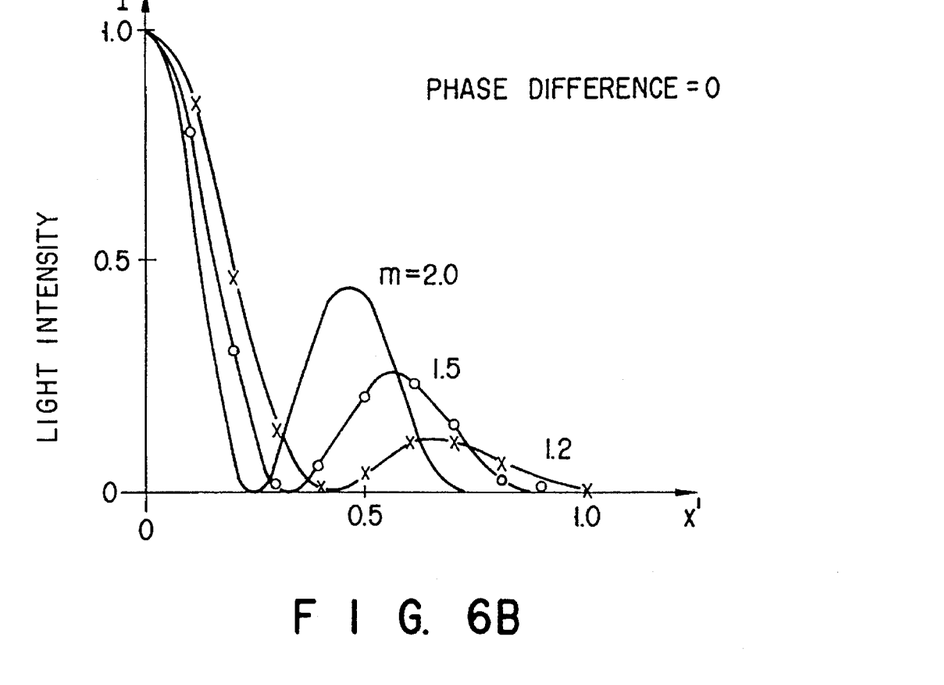
FIG. 6B shows a diffraction light intensity distribution obtained when a coherent beam with a phase difference of zero is irradiated on the pit pattern shown in FIG. 2.

FIG. 6A shows a diffraction light intensity distribution at the time the phase difference is $\pi$, and FIG. 6B shows a diffraction light intensity distribution at the time the phase difference is 0. These intensity distributions correspond to the pit distance (d) which is given by $d=m.b$ (b: pit width; m: 1.2, 1.5, 2.0)

Actually, the pit diameter (b) may be considered to be 1 µm, and the pit distance (d) 1.2 µm, 1.5 µm, or 2.0 µm.

Normally, the NA of the objective lens is about 0.5.

$NA=f sin\theta=x'=0.5$ f: the focal distance (see FIG. 2) of the first and second objective lenses 2 and 8.

Accordingly, a diffraction beam of x'>0.5 departs from the lens and is lost. This means that pattern information (data relating to the distance between pits) is lost when the diffraction pattern 6 is formed.

As is clear from comparison between FIGS. 6A and 6B, in the case where the phase difference=0 (see FIG. 6B), when the pit distance (d) is decreased (i.e. m is decreased), a high-order diffraction light component departs outside the region of the NA of the lens, and two points on the pit pattern 4 cannot be resolved.

On the other hand, when the phase difference is $\pi$ (see FIG. 6A), the diffraction distribution of x'=0 does not occur, but the diffraction component of x'<0.5 increases; thus, the pattern image 12 is substantially reproduced. In this case, even if the pit distance (d) of the pit pattern 4 is decreased (i.e. m is decreased), most of the high-order diffraction light component is detected and thus two points on the pit pattern 4 can be resolved. Specifically, even when the distance between pits 15 (FIG. 4) is reduced, as stated above (e.g. 1.2 µm, 1.5 µm), the peak position of the diffraction light can be brought into the range of the NA of the objective lens with high light intensity. Accordingly, the presence/absence of a pit within the distance of diffraction limit or less can be detected, unlike in the prior art. This means that the recording density of the recording medium can be enhanced.

This principle is applied to the optical recording/reproducing method according to the first embodiment. A reproducing laser beam is scanned on a track which is formed with a distance less than the resolution limit, thereby independently and simultaneously reproducing different data recorded on the land 16 and groove 18. In this case, the diffraction beams reflected by the land 16 and groove 18 are made to have opposite phases.

Specifically, the relative heights of the land 16 and groove 18 are adjusted so that the phases of the reflected diffraction beams reflected from the land 16 and groove 18 may be displaced from each other by $\pi$ (hereinafter, such diffraction beams are referred to as phase-shift beams).

Figure 4:
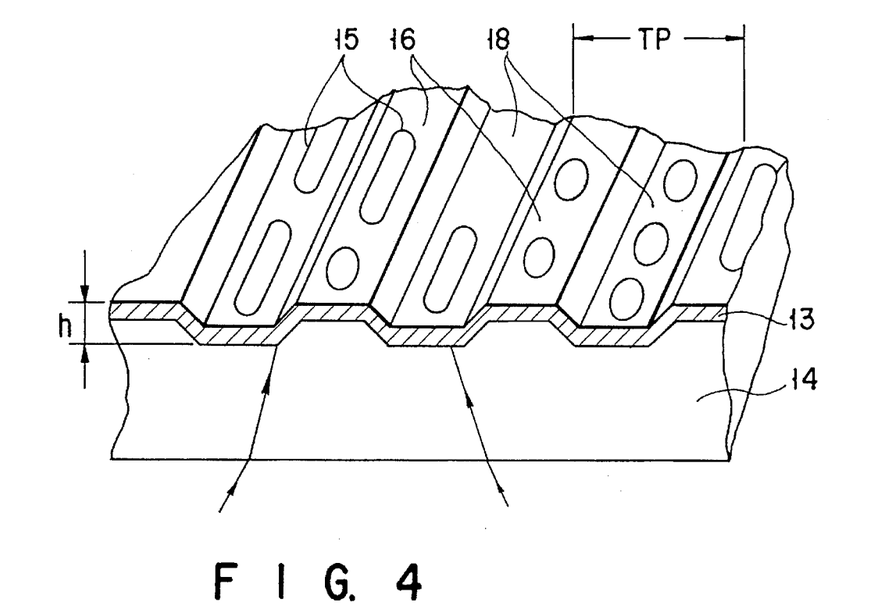
FIG. 4 is an enlarged perspective view of a portion of a recording medium used for the optical recording/ reproducing method according to the first embodiment of the present invention.

FIG. 4 is an enlarged view of a portion of the recording medium 14 applied to the present embodiment.

As is shown in FIG. 4, a recording film 13 having a predetermined thickness is formed on the recording medium 14. The recording film 13 has a track with a track pitch TP of 1.6 µm. This track has land 16 and groove 18. The width of each of land 16 and groove 18 is about 0.8 µm. There is a difference in height (h) between the groove 18 and land 16. The groove 18 is lower than the land 16 by the height (h). Specifically, the height (h) is determined so as to meet the relationship, $h=(2n-1)\lambda/4$ (n: natural number; $\lambda$: the wavelength of the beam irradiated on the track).

Different data are recorded on the land 16 and groove 18 by means of an ordinary recording optical system (not shown). For example, data is recorded in such a manner that a recording laser beam is irradiated along the land 16 and pits 15 (diameter: 0.5 µm or less) coded in accordance with data are formed. In addition, the recording laser beam is irradiated along the groove 18, and pits 15 (diameter: 0.8 µ or less) coded in accordance with other data are formed. As a result, different data are recorded on the land 16 and groove 18. Thus, the recording density is increased.

As has been stated above, the heights of the land 16 and groove 18 differ from each other by a multiplication of (2n–1)/4 (n: natural number); thus, the pits 15 can be formed with high precision without optical influence from the adjacent land 16 or groove 18.

Figure 3:
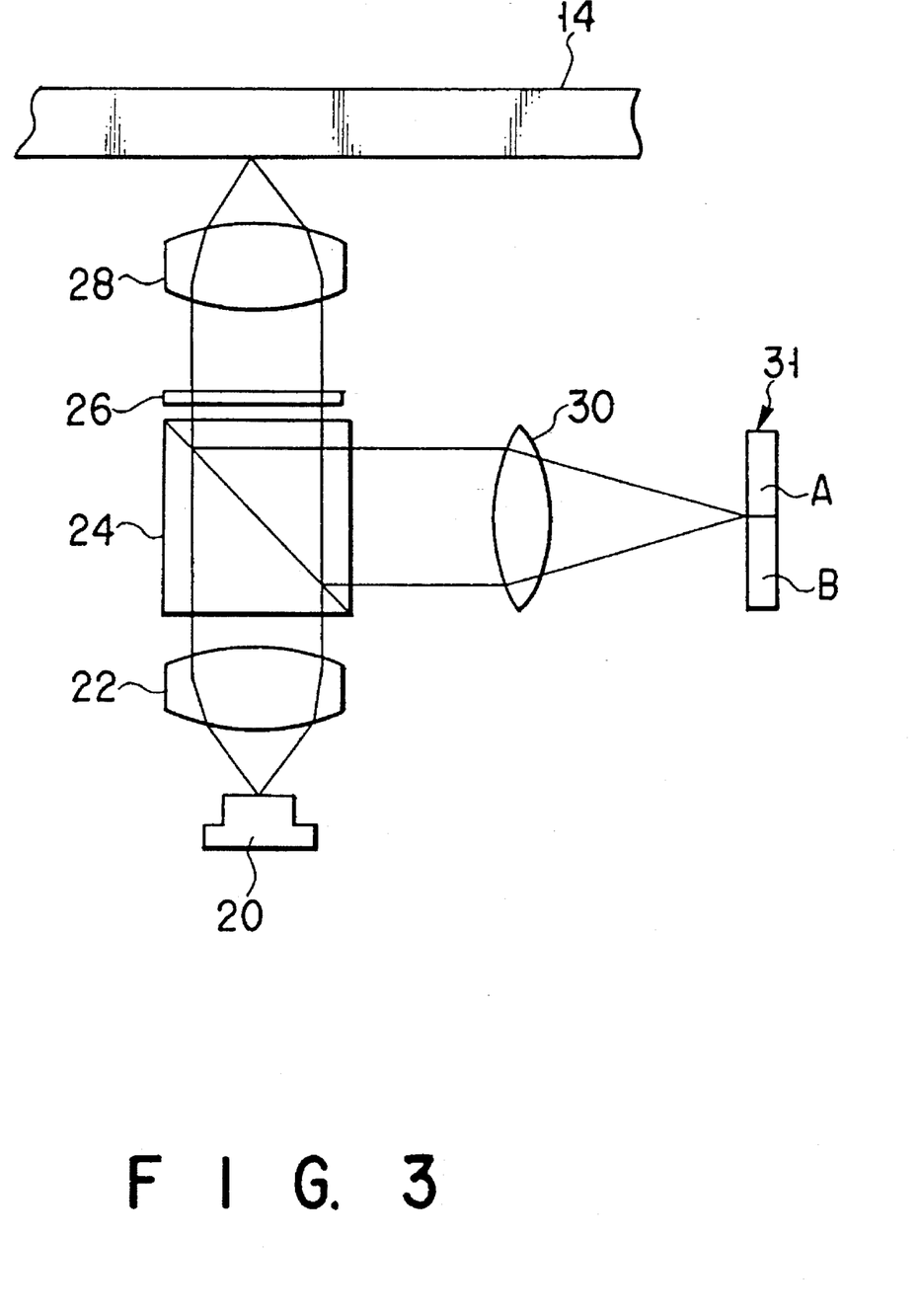
FIG. 3 shows schematically the structure of a reproducing optical system used for the optical recording/reproducing method according to a first embodiment of the present invention.

FIG. 3 schematically shows the structure of a reproducing optical system to which the optical recording/reproducing method of this embodiment is applied.

As is shown in FIG. 3, a reproducing laser beam (wavelength ($\lambda$): 0.78 to 0.83 µm) emitted from a semiconductor laser 20 enters a polarization beam splitter 24 through a collimator lens 22. The beam splitter 24 passes only a light component (P-component) oscillating in a direction parallel to the incidence plane and reflects a light component (S-component) oscillating in a direction perpendicular to the incidence plane. Thus, only the P-component of the reproducing laser beam is passed through the beam splitter 24 and made incident on a ¼ wavelength plate 26. The ¼ wavelength plate 26 converts the incident linear polarized light to circular polarized light. The circular polarized light is irradiated on an objective lens 28 (NA=0.5 to 0.6). The reproducing laser beam is irradiated through the objective lens 28 onto the land 16 and groove 18 simultaneously and uniformly in the form of a beam spot with an intensity of 1/$e^2$ and a diameter of about 1.6 µm.

Reflected diffraction beam components reflected from the pits 15 formed on the land 16 and groove 18 have a phase difference of $\pi$ and constitute a phase-shift beam. The phase-shift beam is irradiated on the ¼ wavelength plate 26 through the objective lens 28 once again. The phase-shift beam produced by the recording medium 14 used in the present embodiment has the phase difference $\pi$, and its polarization direction is not changed at all. Thus, the phase-shift beam is converted to a linear polarized beam, with the polarization plane rotated by 90° from the initial linear polarized beam. Accordingly, the phase-shift beam is reflected by the polarization beam splitter 24 and guided to an image-forming lens 30. The image-forming lens 30 functions to magnify the phase-shift beam 100 to 1000 times and to form an image.

In this case, the contrast of the formed image reduces slightly. However, in the present invention, data reproduction is performed by detecting two-value digital signals and therefore the reduction in contrast does not influence the detection of pits 15.

The phase-shift beam is focused on a two-part photodiode 31 by the image-forming lens 30. The photodiode 31 is designed such that the peak of the reflected diffraction beam component reflected from the land 16 is located on a region A of the photodiode 31, and the peak of the reflected diffraction beam component reflected from the groove 18 is on a region B. Electric signals corresponding to the amounts of light radiated on the regions A and B are output from the regions A and B.

Figure 5:
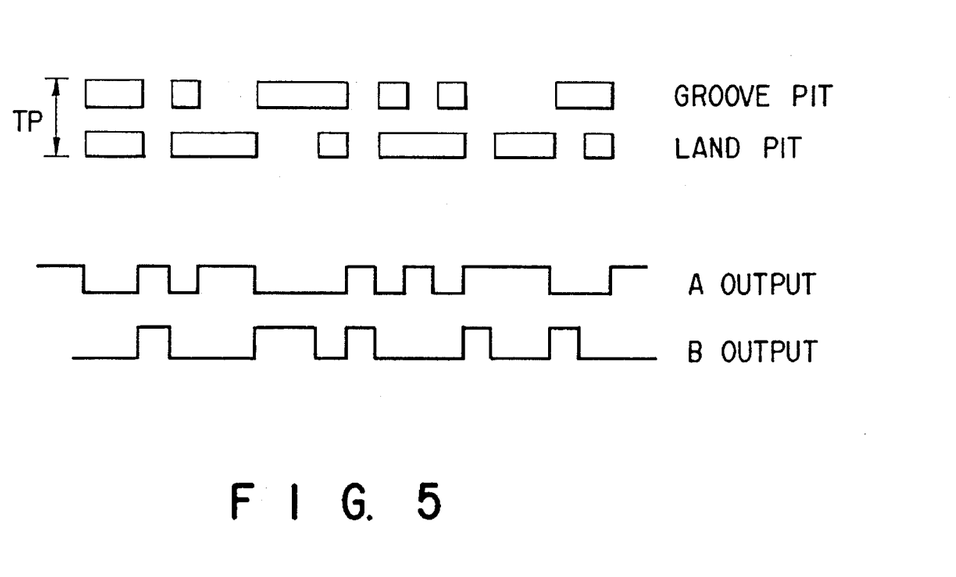
FIG. 5 is a timing chart illustrating the relationship of the pits formed on a land and a groove, and outputs A and B output from regions A and B of a two-part photodiode.

FIG. 5 is a timing chart showing the relationship between pits 15 formed on the land 16 and groove 18, and outputs A and B from the regions A and B corresponding to these pits. In FIG. 5, the reflectance of the pits 15 is lower than that of non-recording portions.

The positions of the pits 15 formed on the land 16 and groove 18 can be detected by detecting the areas with low outputs A and B. Thus, pit data recorded on the land 16 and groove 18 is reproduced.

Needless to say, focus tracking servo is performed at the time of reproduction. Specifically, since the land 16 and groove 18 are formed with a difference in height of $(2n-1)\lambda/4$, a push-pull method is not applicable. In the present embodiment, the tracking servo is performed by a three-beam method. Focusing servo is based on an astigmatic method.

According to the optical recording/reproducing method of this embodiment, the relative heights of the land 16 and groove 18 are determined so that reflected diffraction beam components reflected from the track have a phase difference $\pi$. Thereby, pits 15 on the land 16 and groove 18 at a distance less than the diffraction limit can be detected. Thus, the recording density of the recording medium 14 can be enhanced. In addition, the output B corresponding to the pit position of the land 16 and the output A corresponding to the pit position of the groove 18 can simultaneously be detected. Thus, the data transfer rate at the time of reproduction can be enhanced.

An optical reproducing apparatus according to a second embodiment of the invention, to which the above principle has been applied, will now be described with reference to FIGS. 7, 8, 10A and 10B.

Figure 7:
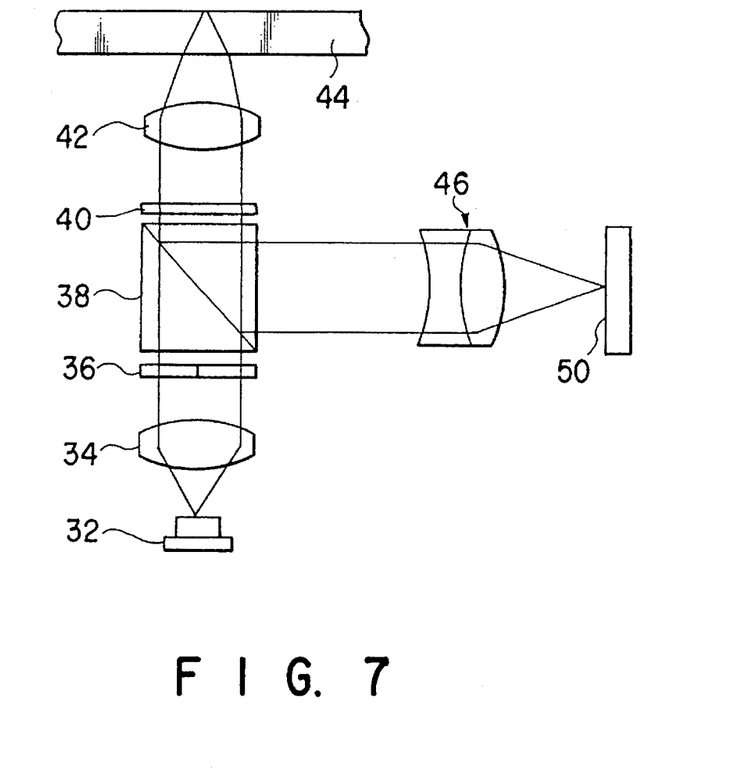
FIG. 7 shows schematically the structure of an optical reproducing apparatus according to a second embodiment of the invention.

A laser diode for emitting near infrared of wavelengths of 780 to 830 nm is used as a light source 32. A reproducing laser beam emitted from the light source 32 is converted to a parallel beam through a collimator lens 34 and made incident on a phase plate 36.

The phase plate 36 has two regions which are divided substantially equally in the track direction of a recording medium 44. The phase plate 36 shifts the phase of a laser beam component incident on one of the regions by substantially $\pi$, i.e. $(2n+1)\pi$ (n: natural number) in relation to the phase of a laser beam component incident on the other region, without varying the amplitude of the beam. The phase plate 36 is formed by depositing a thin film of ZnS or the like on a predetermined region on a transparent substrate.

The reproducing laser beam, which has passed through the phase plate 36 consists of two beam components having a phase difference $\pi$ (hereinafter, this beam is referred to as "phase-shift beam").

The phase-shift beam travels through the polarization beam splitter 38 and ¼ wavelength plate 40, and the beam is focused on the recording medium 44 through the objective lens 42.

Figure 10A:
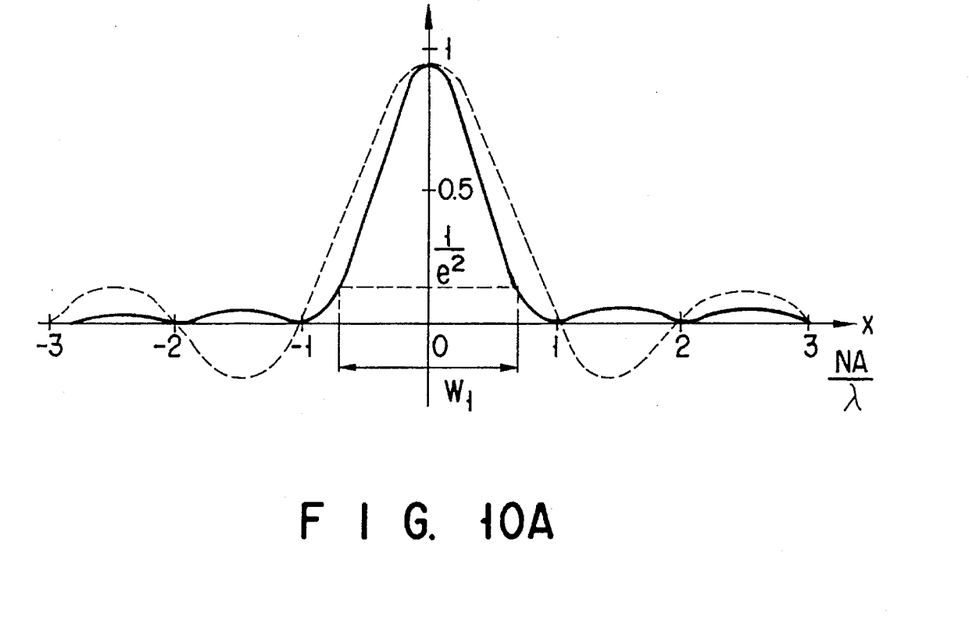
FIG. 10A shows an intensity distribution of an ordinary reproducing laser beam when the beam is converged on the recording medium.
Figure 10B:
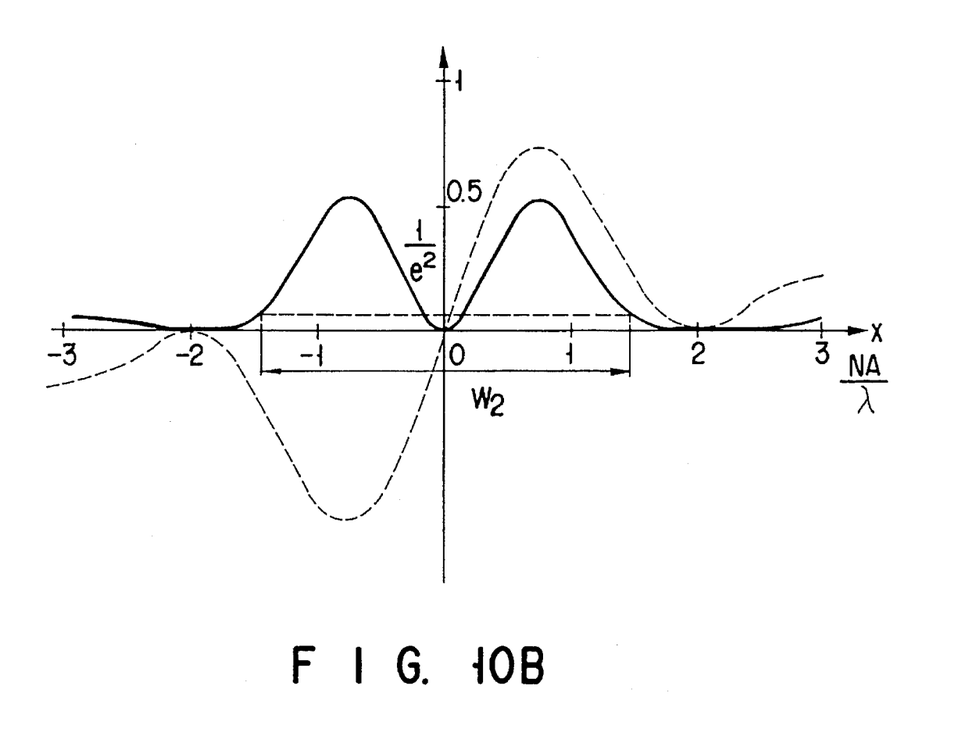
FIG. 10B shows an intensity distribution of a phase shift beam when the beam is converged on the recording medium.

The light intensity distribution of the phase-shift beam on the image-formation surface is a bimodal distribution having two peaks as shown in FIG. 10B. If it is supposed that the diameter of the portion of the beam which has a light intensity of $1/e^2$ at each peak is the diameter of the beam, the diameter $w_2$ of the beam in a direction perpendicular to the track is double the diameter $w_1$ of the ordinary reproducing laser beam having the intensity distribution shown in FIG. 10A.

At present, the diameter $w_1$ corresponds to the track pitch TP, and generally $w_1=1.6$ μm. The beam spot of the phase-shift beam is equivalent to two spots of ordinary reproducing laser beams which are juxtaposed in a direction perpendicular to the track.

Figure 8:
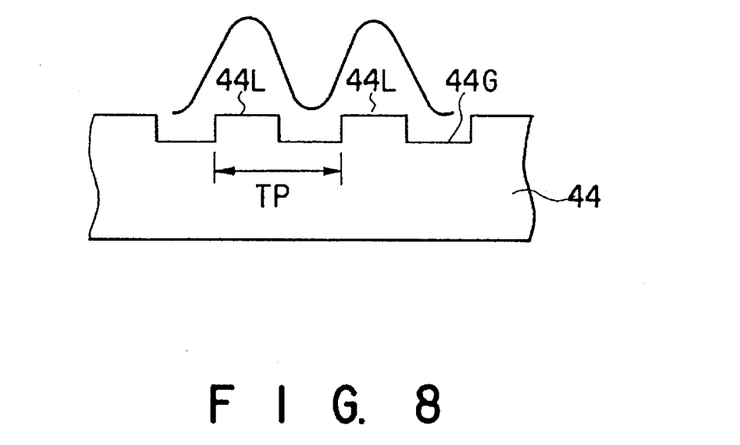
FIG. 8 illustrates the relationship between the irradiation positions of two reproducing beams and the intensity distribution of the two reproducing beams scanned simultaneously on two lands of the recording medium.

As is shown in FIG. 8, the reproducing apparatus of the present embodiment is constructed such that the phase-shift beam is simultaneously irradiated on two lands 44L.

A reflection beam from the lands 44L is irradiated on the ¼ wavelength plate 40 once again through the objective lens 42. The reflection beam, which has entered the ¼ wavelength plate 40, is converted to a linear polarized beam whose polarized component is displaced by 90° in relation to the initial linear polarized beam. Thus, the beam emitted from the ¼ wavelength plate 40 is reflected by the polarizing beam splitter 38 and irradiated on the image-forming lens 46.

The reflection beam irradiated on the image-forming lens 46 is projected onto a photodetector 50 (e.g. a two-part photodiode) via the image-forming lens 46. The photodetector 50 detects the brightness/darkness of the image formed on the surface of the photodetector 50, thereby detecting the presence/absence of the pits. Since the size of the pit is about 1 μm, the reflected beam is magnified 100 to 1000 times by the image-forming lens 46 and projected, so that the photodetector 50 can precisely detect the presence/absence of the pit.

The magnification of the beam lowers the contrast of the image; however, there is no practical problem only if the presence/absence of the pit can be detected, since the data reproduction is performed on the basis of two-value digital detection.

In the tracking control according to this embodiment, a plurality of tracks are simultaneously illuminated, and a push-pull method is not applicable. Thus, a three-beam method is applied. In addition, focusing control is performed by an astigmatic method or a critical angle method.

In the optical reproducing apparatus of the present embodiment, the data on two tracks can simultaneously be reproduced and therefore double the transfer rate, as compared to reproduction with a single beam, can be achieved. In addition, without using an expensive, complex conventional mechanism such as a laser array or a double head, two beam components can easily be obtained by providing the phase plate.

A third embodiment of the invention to which the above principle has been applied will now be described with reference to FIGS. 9A and 9B. In the third embodiment, the same optical system as in the reproducing apparatus of FIG. 7 is used.

Figure 9A:
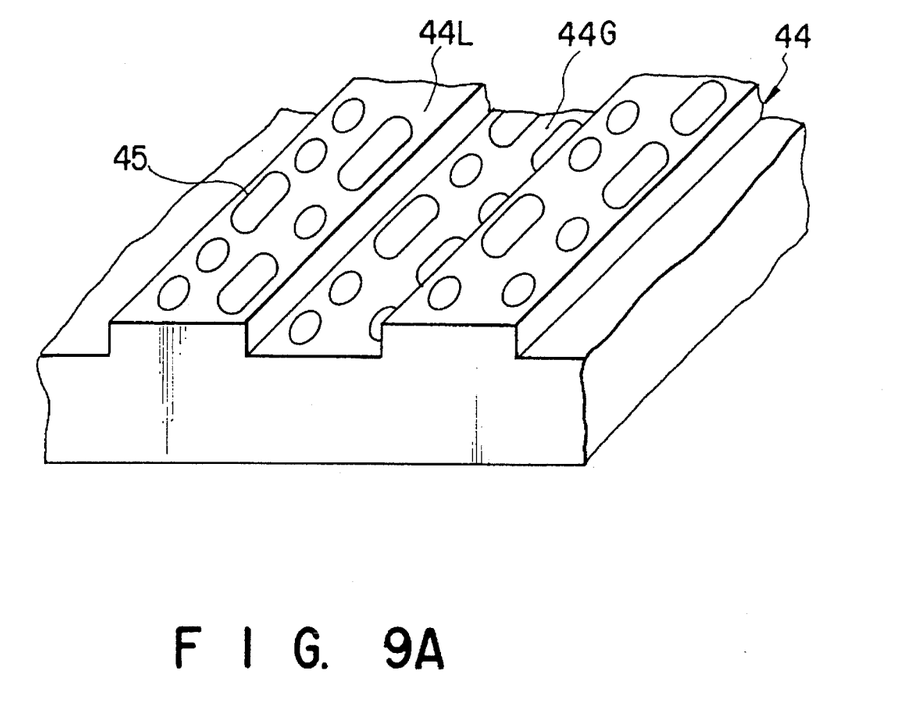
FIG. 9A is an enlarged perspective view of a portion of a recording medium according to a third embodiment of the invention.

As shown in FIG. 9A, a recording medium 44 has a land 44L and a groove 44G. A difference (h) in height (h) between the land 44L and groove G is determined so as to satisfy the relationship, $h=(2n-1)\lambda/4$ (n: natural number; $\lambda$: wavelength of light from source 32). Each of the land 44L and groove 44G has a width of 1.6 µm and has two lines of pits 45.

Figure 9B:
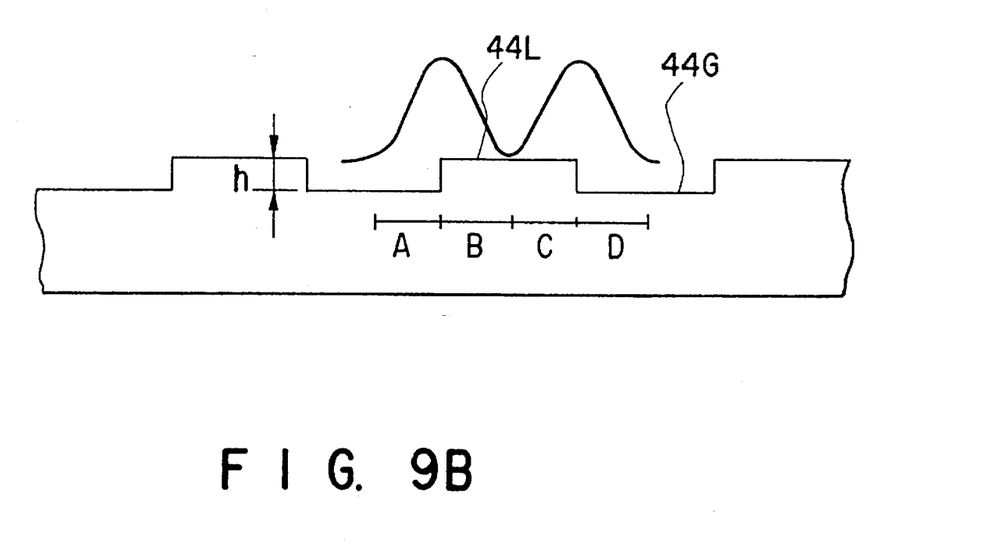
FIG. 9B illustrates the relationship between the irradiation positions of two reproducing beams and the intensity distribution of the two reproducing beams scanned on the recording medium shown in FIG. 9A.

As is shown in FIG. 9B, the phase-shift beam used in this embodiment is irradiated such that its peaks in intensity distribution are located at the boundaries between the land 44L and groove 44G.

Although regions A and B shown in FIG. 9B are irradiated by the beam of the same phase, there is a difference in height of $(2n-1)\lambda/4$ between regions A and B. Thus, a phase difference of $(2n-1)\pi$ occurs between reflected beam components reflected from the regions A and B. The same can be said of regions C and D.

As a result, reflected beam components from regions A to D are displaced from one another by $\pi$. Accordingly, when an image is formed by using the optical reproducing apparatus shown in FIG. 7, images produced by regions A to D can be separated and focused on the photodetector 50. Thus, two-value data can be reproduced by using, for example, a four-part photodiode having aligned light receivers as photodetector 50.

In the present invention, two lines of pits can be formed within the width of 1.6 µm. Thus, the recording density of the recording medium is double the density of an ordinary recording medium. In addition, since data on the four lines of pits can simultaneously be reproduced, the transfer rate can be increased four times.

The present invention is not limited to the above embodiments. For example, the necessary characteristic for the recording medium used in this invention is that an optical contrast is provided between the recording region storing data and the non-recording region. Thus, any recording mediums having variable reflectance and polarization angles can be used. Examples of such recording mediums are:

(ROM-type) . . . reflection films of Al or Au with predetermined patterns, (rewritable type) . . . metal reflection films of a Te alloy, etc., and organic films of pigments, and (reversible type) . . . films with variable reflectances of a Te alloy, etc. and films with polarization planes of a rare-earth element—transitional metal magnetic substance (TbFeCo, garnet).

The land and groove are not necessarily required. A recording medium with a track pitch TP of 1.6 µm is applicable to the invention.

It is also possible to record data on the land and groove synchronously with use of the same clock, and reproduce the data with use of the same clock. In addition, it is possible to record/reproduce data on the land and groove with non-synchronous clocks, and generate clocks independently at the time of reproduction.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A reproducing apparatus for reproducing data from an optical recording medium on which grooves and lands are alternately formed, each groove having a height which is relatively different from a height of each land by a degree corresponding to $(2n-1)/4$, where n is a natural number, times the wavelength of an irradiated beam, each groove and each land having at least one line of pits recorded as data thereon, the lines of pits being arranged substantially in parallel with a close distance between adjacent lines of pits of less than Rayleigh resolution, said reproducing apparatus comprising:

a light source;

first optical means for guiding a light beam emitted from said light source onto said optical recording medium, for illuminating with said light beam a pair of adjacent ones of said grooves and lands simultaneously;

photoelectric conversion means, having first and second light-receiving regions, each light-receiving region being arranged relative to each other and relative to the recording medium so as to output an electrical signal corresponding to a light amount of a light beam received from said lines of pits on said adjacent groove and land which are spaced by a distance of less than said Rayleigh resolution, and which adjacent groove and land are illuminated simultaneously by the light source; and second optical means being arranged to guide a first light beam component from the groove of the pair of adjacent groove and land which are illuminated simultaneously by the light source, and to guide a second beam component from the land of the pair of adjacent groove and land which are illuminated simultaneously by the light source, to the first and second light-receiving regions, respectively, said first and second light beam components each being provided with a phase difference due to the difference in height between the groove and the adjacent land and by virtue of the spacing between pit lines of the adjacent groove and land.

2. The reproducing apparatus according to claim 1, wherein:

said first optical means includes third optical means for providing a phase difference of $\pi$ to an almost half of said beam guided onto said optical recording medium, for thereby radiating first and second light beam spots having a relative phase difference of $\pi$ simultaneously onto the adjacent groove and land of the optical recording medium;

said photoelectric conversion means includes at least four light-receiving regions; and two pairs of first and second beam components, each pair being provided with a phase difference due to a difference in height between the groove and the land, are generated form the groove and land which have been simultaneously illuminated with said first and second beam spots, and said two pairs of first and second beam components are separately guided to said at least four light-receiving regions by said second optical means.

3. The reproducing apparatus according to claim 2, wherein said third optical means comprises a phase plate.

4. The reproducing apparatus according to claim 2, wherein:

said first optical means further comprises a collimating lens for converting the light beam emitted from the light source to a parallel light beam, and an objective lens for radiating said parallel light beam onto the optical recording medium; and said third optical means is arranged in a passage of said parallel light beam.

5. The reproducing apparatus for reproducing data from an optical recording medium on which grooves and lands are alternately formed, each groove having a height which is relatively different from a height of each land by a degree corresponding to $(2n-1)/4$, where n is a natural number, times the wavelength of an irradiated beam, said reproducing apparatus comprising:

a light source;

first optical means for guiding a light beam emitted from said light source onto said optical recording medium, for illuminating with said light beam a pair of adjacent ones of said grooves and lands simultaneously;

photoelectric conversion means, having at least two light-receiving regions, for outputting an electrical signal corresponding to a light amount of a received light beam; and second optical means for guiding first and second light beam components emitted from said pair of a groove and a land separately to said at least two light-receiving regions, said first and second light beam components each being provided with a phase difference due to the difference in height between the groove and the land; and wherein:

said first optical means includes third optical means for providing a phase difference of $\pi$ to an almost half of said light beam guided onto said optical recording medium, for thereby radiating first and second beam spots having a relative phase difference of $\pi$ simultaneously onto the adjacent groove and land of the optical recording medium;

said photoelectric conversion means includes at least four light-receiving regions; and two pairs of first and second light beam components, each pair being provided with a phase difference due to a difference in height between the groove and the land, are generated from the groove and land which have been simultaneously illuminated with said first and second beam spots, and said two pairs of first and second light beams are separately guided to said at least four light-receiving regions by said second optical means.

6. The reproducing apparatus according to claim 5, wherein said third optical means comprises a phase plate.

7. The reproducing apparatus according to claim 5, wherein:

said first optical means comprises a collimating lens for converting the light beam emitted from the light source to a parallel light beam, and an objective lens for radiating said parallel light beam onto the optical recording medium; and said third optical means is arranged in a passage of said parallel light beam.

8. A reproducing apparatus for reproducing data from an optical recording medium on which a plurality of pit lines are arranged substantially in parallel, said reproducing apparatus comprising:

a light source;

first optical means for guiding a light beam emitted from said light source onto said optical recording medium;

photoelectric conversion means, having at least two light-receiving regions, for outputting an electrical signal corresponding to a light amount of a received light beam; and second optical means for guiding first and second light beam components emitted from said optical recording medium to said light-receiving regions of said photoelectric conversion means, wherein said first optical means includes third optical means for providing a phase difference of $\pi$ to an almost half of said light beam guided onto said optical recording medium, thereby radiating first and second beam spots having a relative phase difference of $\pi$ simultaneously onto two adjacent pit lines on the optical recording medium, and first and second light beam components emitted from said two adjacent pit lines on which said first and second beam spots have been radiated are guided by said second optical means separately to said at least two light-receiving regions.

9. The reproducing apparatus according to claim 8, wherein said third optical means comprises a phase plate.

10. The reproducing apparatus according to claim 8, wherein:

said first optical means comprises a collimating lens for converting the light beam emitted from the light source to a parallel light beam, and an objective lens for radiating said parallel light beam onto the optical recording medium; and said third optical means is arranged in a passage of said parallel light beam.

11. A reproducing apparatus according to claim 8, wherein:

said optical recording medium has a plurality of alternately arranged grooves and lands; and first and second light beam components emitted from said groove or land on which said first and second beam spots have been radiated by said third optical means are guided by said second optical means separately to said at least two light-receiving regions.

12. The reproducing apparatus according to claim 11, wherein said third optical means comprises a phase plate.

13. The reproducing apparatus according to claim 11, wherein:

said first optical means comprises a collimating lens for converting the light beam emitted from the light source to a parallel light beam, and an objective lens for radiating said parallel light beam onto the optical recording medium; and said third optical means is arranged in a passage of said parallel light beam.

14. A combination of an optical recording medium on which data is recorded optically, and the a reproducing apparatus, wherein:

the optical recording medium comprises:

a substrate; and a plurality of pit lines arranged substantially in parallel in the substrate with a close distance between adjacent pit lines of a Rayleigh resolution or less, said pit lines representing the data optically; and the reproducing apparatus comprises:

a light source;

first optical means for guiding a light beam emitted from said light source onto said optical recording medium;

photoelectric conversion means, having at least two light-receiving regions, for outputting an electrical signal corresponding to a light amount of a received light beam; and second optical means for guiding first and second light beam components emitted from said optical recording medium to said light-receiving regions of said photoelectric conversion means, wherein said first optical means includes third optical means for providing a phase difference of $\pi$ to an almost half of said light beam guided onto said optical recording medium, thereby radiating first and second beam spots having a relative phase difference of $\pi$ simultaneously onto two adjacent pit lines on the optical recording medium, and first and second light beam components emitted from said two adjacent pit lines on which said first and second beam spots have been radiated are guided by said second optical means separately to said at least two light-receiving regions.

15. The combination of an optical recording medium and reproducing apparatus according to claim 14, wherein said optical recording medium further comprises:

grooves and lands alternately arranged on said substrate, each groove having a height which is relatively different from a height of each land by a degree corresponding to $(2n-1)/4$, where n is a natural number, times the wavelength of an irradiated beam; and at least one line of pits recorded as data on the grooves and lands.

16. A combination of an optical recording medium on which data is recorded optically, and reproducing apparatus, wherein:

the optical recording medium comprises:

grooves and lands alternately arranged on a substrate, each groove having a height which is relatively different from a height of each land by a degree corresponding to $(2n-1)/4$, wherein n is a natural number, times the wavelength of an irradiated beam; and two lines of pits recorded as data on the grooves and lands; and the reproducing apparatus comprises:

a light source;

first optical means for guiding a light beam emitted from said light source onto said optical recording medium;

photoelectric conversion means, having at least two light-receiving regions, for outputting an electrical signal corresponding to a light amount of a received light beam; and second optical means for guiding first and second light beam components emitted from said optical recording medium to said light-receiving regions of said photoelectric conversion means, wherein said first optical means includes third optical means for providing a phase difference of $\pi$ to an almost half of said light beam guided onto said optical recording medium, thereby radiating first and second beam spots having a relative phase difference of $\pi$ simultaneously onto two adjacent pit lines on the optical recording medium, and first and second light beam components emitted from said two adjacent pit lines on which said first and second beam spots have been radiated are guided by said second optical means separately to said at least two light-receiving regions.

17. The combination of an optical recording medium and reproducing apparatus according to claim 16, wherein said pit lines are arranged substantially in parallel with a close distance between adjacent pit lines of a Rayleigh resolution or less.

18. The combination of an optical recording medium on which data is recorded optically, and a reproducing apparatus, wherein the optical recording medium comprises:

grooves and lands alternately arranged on said substrate, each groove having a height which is relatively different from a height of each land by a degree corresponding to $(2n-1)/4$, where n is a natural number, times the wavelength of an irradiated beam; and at least one line of pits recorded as data on the grooves and lands; and the reproducing apparatus comprises:

a light source;

first optical means for guiding a light beam emitted from said light source onto said optical recording medium, for illuminating with said light beam a pair of adjacent ones of said grooves and lands simultaneously;

photoelectric conversion means, having at least two light-receiving regions, for outputting an electrical signal corresponding to a light amount of a received light beam; and second optical means for guiding first and second light beam components emitted from said pair of a groove and a land separately to said at least two light-receiving regions, said first and second light beam components each being provided with a phase difference due to the difference in height between the groove and the land; and wherein:

said first optical means includes third optical means for providing a phase difference of $\pi$ to an almost half of said light beam guided onto said optical recording medium, for thereby radiating first and second beam spots having a relative phase difference of $\pi$ simultaneously onto the adjacent groove and land of the optical recording medium;

said photoelectric conversion means includes at least four light-receiving regions; and two pairs of first and second light beam components, each pair being provided with a phase difference due to a difference in height between the groove and the land, are generated from the groove and land which have been simultaneously illuminated with said first and second beam spots, and said two pairs of first and second light beams are separately guided to said at least four light-receiving regions by said second optical means.

19. A combination of an optical recording medium on which data is recorded optically, and a reproducing apparatus, wherein:

the recording medium comprises:

grooves and lands alternately arranged on a substrate, each groove having a height which is relatively different from a height of each land by a degree corresponding to $(2n-1)/4$, wherein n is a natural number, times the wavelength of an irradiated beam; and two lines of pits recorded as data on the grooves and lands; and the reproducing apparatus comprises:

a light source;

first optical means for guiding a light beam emitted from said light source onto said optical recording medium, for illuminating with said light beam a pair of adjacent ones of said grooves and lands simultaneously;

photoelectric conversion means, having at least two light-receiving regions, for outputting an electrical signal corresponding to a light amount of a received light beam; and second optical means for guiding first and second light beam components emitted from said pair of a groove and a land separately to said at least two light-receiving regions, said first and second light beam components each being provided with a phase difference due to the difference in height between the groove and the land; and wherein:

said first optical means includes third optical means for providing a phase difference of $\pi$ to an almost half of said light beam guided onto said optical recording medium, for thereby radiating first and second beam spots having a relative phase difference of $\pi$ simultaneously onto the adjacent groove and land of the optical recording medium;

said photoelectric conversion means includes at least four light-receiving regions; and two pairs of first and second light beam components, each pair being provided with a phase difference due to a difference in height between the groove and the land, are generated from the groove and land which have been simultaneously illuminated with said first and second beam spots, and said two pairs of first and second light beams are separately guided to said at least four light-receiving regions by said second optical means.

20. The combination of a recording medium and reproducing apparatus according to claim 19, wherein said pit lines are arranged substantially in parallel with a close distance between adjacent pit lines of a Rayleigh resolution or less.

21. A recording medium on which data is recorded optically, the recording medium comprising:

a substrate; and a plurality of pit lines arranged substantially in parallel in the substrate with a close distance between adjacent pit lines of less than Rayleigh resolution, said pit lines representing the data optically.

22. The recording medium according to claim 21, further comprising:

grooves and lands alternatively arranged on said substrate, each groove having a height which is relatively different from a height of each land by a degree corresponding to $(2n-1)/4$, where n is a natural number, times the wavelength of an irradiated beam.

23. A recording medium on which data is recorded optically, the recording medium comprising:

grooves and lands alternatively arranged on a substrate, each groove having a height which is relatively different from a height of each land by a degree corresponding to $(2n-1)/4$, where n is a natural number, times the wavelength of an irradiated beam; and two lines of pits recorded as data on each of the grooves and lands; and wherein said pit lines are arranged substantially in parallel with a close distance between adjacent pit lines of less than Rayleigh resolution.

24. A reproducing apparatus for reproducing data from an optical recording medium on which grooves and lands are alternately formed, each groove having a height which is relatively different from a height of each land by a degree corresponding to $(2n-1)/4$, where n is a natural number, times the wavelength of an irradiated beam, said reproducing apparatus comprising:

a light source;

first optical means for guiding a light beam emitted from said light source onto said optical recording medium, for illuminating with said light beam a pair of adjacent ones of said grooves and lands simultaneously;

photoelectric conversion means, having first and second light-receiving regions, each light-receiving region being arranged to output an electrical signal corresponding to a light amount of a received light beam; and second optical means for guiding a first light beam component from the groove of the pair of adjacent groove and land which are illuminated simultaneously by the light source, and for guiding a second beam component from the land of the pair of adjacent groove and land which are illuminated simultaneously by the light source, to the first and second light-receiving regions, respectively, said first and second light beam components each being provided with a phase difference due to the difference in height between the groove and the adjacent land;

said first optical means including third optical means for providing a phase difference of $\pi$ to an almost half of said beam guided onto said optical recording medium, for thereby radiating first and second light beam spots having a relative phase difference of $\pi$ simultaneously onto the adjacent groove and land of the optical recording medium;

said photoelectric conversion means including at least four light-receiving regions; and two pairs of first and second beam components, each pair being provided with a phase difference due to a difference in height between the groove and the land, are generated form the groove and land which have been simultaneously illuminated with said first and second beam spots, and said two pairs of first and second beam components are separately guided to said at least four light-receiving regions by said second optical means.

25. The reproducing apparatus according to claim 24, wherein said third optical means comprises a phase plate.

26. The reproducing apparatus according to claim 24, wherein:

said first optical means further comprises a collimating lens for converting the light beam emitted from the light source to a parallel light beam, and an objective lens for radiating said parallel light beam onto the optical recording medium; and said third optical means is arranged in a passage of said parallel light beam.

* * * * *